United States Patent [19]
Volz et al.

[11] Patent Number: 5,472,266
[45] Date of Patent: Dec. 5, 1995

[54] ANTI-LOCK HYDRAULIC BRAKE SYSTEM

[75] Inventors: Peter Volz, Darmstadt; Dalibor Zaviska, Frankfurt am Main, both of Germany

[73] Assignee: ITT Automotive Europe GmbH, Germany

[21] Appl. No.: 211,862

[22] PCT Filed: Oct. 5, 1992

[86] PCT No.: PCT/EP92/02297

§ 371 Date: Apr. 18, 1994

§ 102(e) Date: Apr. 18, 1994

[87] PCT Pub. No.: WO93/08057

PCT Pub. Date: Apr. 29, 1993

[30] Foreign Application Priority Data

Oct. 18, 1991 [DE] Germany .......................... 41 34 490.1

[51] Int. Cl.$^6$ .................. B60T 8/36; B60T 8/40; B60T 8/42; B60T 8/50
[52] U.S. Cl. .................. 303/116.1; 303/115.4; 303/116.2; 303/117.1; 303/119.1; 303/68; 303/900; 303/901; 303/DIG. 1; 303/DIG. 2; 303/119.2
[58] Field of Search .................. 303/117.1, 119.1, 303/119.2, 116.1, 116.2, 116.3, 116.4, 113.1, 113.5, 115.1, 115.4, 115.5, 115.6, 68, 69, DIG. 1, DIG. 2, 900, 901

[56] References Cited

U.S. PATENT DOCUMENTS

| | | | |
|---|---|---|---|
| 3,486,801 | 12/1969 | Frayer | 303/117.1 |
| 3,514,161 | 5/1970 | Frayer | 303/117.1 |
| 3,851,929 | 12/1974 | Grosseau | 303/117.1 |
| 3,871,716 | 3/1975 | Skoyles | 303/115.1 |
| 3,893,693 | 7/1975 | Skoyles | 303/68 X |
| 3,909,073 | 9/1975 | De Gennes | 303/68 X |
| 4,090,739 | 5/1978 | Iio | 303/116.3 X |
| 4,095,851 | 6/1978 | Ando et al. | 303/68 X |
| 4,099,793 | 7/1978 | Iio | 303/116.4 |
| 4,141,597 | 2/1979 | Sato et al. | 303/115.1 |
| 4,179,166 | 12/1979 | Sharp et al. | 303/115.4 |
| 4,422,695 | 12/1983 | Farr | 303/115.4 |
| 4,436,348 | 3/1984 | Farr | 303/115.4 |
| 4,457,563 | 7/1984 | Farr | 303/115.4 X |
| 4,619,289 | 10/1986 | Tsuru et al. | 303/119.2 X |
| 4,715,666 | 12/1987 | Farr | 303/116.4 |
| 4,720,151 | 1/1988 | Belart et al. | 303/68 X |
| 4,725,105 | 2/1988 | Brown | 303/116.4 |
| 4,752,104 | 6/1988 | Miyake | 303/115.4 |
| 4,775,193 | 10/1988 | Farr et al. | 303/72 X |
| 4,779,935 | 10/1988 | Kuwana et al. | 303/115.4 |
| 4,781,421 | 11/1988 | Nishimura et al. | 303/115.4 |
| 4,834,468 | 5/1989 | Kuwana et al. | 303/115.4 |
| 4,883,327 | 11/1989 | Farr | 303/116.4 |
| 4,915,459 | 4/1990 | Hashida et al. | 303/117.1 X |
| 4,964,681 | 10/1990 | Burgdorf et al. | 303/115.4 |
| 5,002,344 | 3/1991 | Hashida | 303/117.1 |
| 5,004,301 | 4/1991 | Yamada et al. | 303/115.4 |
| 5,026,123 | 6/1991 | Nokubo et al. | 303/117.1 |
| 5,094,512 | 3/1992 | Kohno et al. | 303/117.1 |

(List continued on next page.)

FOREIGN PATENT DOCUMENTS

| | | |
|---|---|---|
| 0171901 | 2/1986 | European Pat. Off. . |
| 0242132 | 10/1987 | European Pat. Off. . |
| 0344544 | 12/1989 | European Pat. Off. . |
| 0361336 | 4/1990 | European Pat. Off. . |
| 3936697 | 5/1990 | Germany . |
| 4104144 | 8/1992 | Germany ............ 303/115.4 |
| 2090929 | 7/1982 | United Kingdom . |

Primary Examiner—Douglas C. Butler
Attorney, Agent, or Firm—Dykema Gossett

[57] ABSTRACT

An anti-lock hydraulic brake system is disclosed with a flow control valve in the brake line. To prevent the flow control valve from performing its control function during a normal braking operation, a retaining piston works in conjunction with a spring such that the retaining spring bears against a piston of the flow control valve and retains the flow control valve piston in its initial position during normal braking operation. The retaining piston also serves as a valve closure member for a valve in the return line.

15 Claims, 12 Drawing Sheets

U.S. PATENT DOCUMENTS

| | | | |
|---|---|---|---|
| 5,098,173 | 3/1992 | Beck et al. | 303/DIG. 2 |
| 5,114,216 | 5/1992 | Tsuda et al. | 303/117.1 |
| 5,152,589 | 10/1992 | Ocvirk | 303/DIG. 1 |
| 5,174,636 | 12/1992 | Burgdorf et al. | 303/116.1 |
| 5,188,439 | 2/1993 | Burgdorf et al. | 303/116.1 |
| 5,215,359 | 6/1993 | Burgdorf et al. | 303/115.4 |
| 5,221,129 | 6/1993 | Takasaki | 303/117.1 X |
| 5,261,731 | 11/1993 | Yogo et al. | 303/116.1 |
| 5,295,739 | 3/1994 | Burgdorf et al. | 303/113.1 |

ANTI-LOCK HYDRAULIC BRAKE SYSTEM

TECHNICAL FIELD

The present invention relates to an anti-lock hydraulic brake system and more particularly to anti-lock hydraulic brake systems comprising a master cylinder, at least one wheel brake which connects by way of a brake line to the master cylinder, a pressure-fluid collecting means which connects to the wheel brake by way of a return line, a pump which supplies fluid out of the pressure-fluid collecting means into the brake line, a flow control valve in the brake line and an electromagnetically operated outlet valve in the return line.

BACKGROUND OF THE INVENTION

A brake system of this type is known from EP A1 0344 544. This brake system provides a bypass line to the flow control valve so that during a normal braking operation the pressure fluid connection between the wheel brake and the master cylinder is not established by way of the flow control valve.

The present invention improves the flow control valve in that it eliminates any influence the flow control valve would otherwise have on the speed of pressure increase during a normal braking operation.

In a favourable manner, this feature can be realized by a retaining piston which keeps a movable part of the flow control valve in an initial position so that the flow control valve is not allowed to perform its control function during a normal braking operation.

Advantageously, the retaining piston simultaneously controls a valve in the return line.

Instead of a retaining piston which keeps the flow control valve piston in its initial position, a valve may also be provided in parallel to the restrictor of the flow control valve which valve is kept in its opened position through a tappet of the retaining piston.

The restrictor can be designed as a notch in the valve seat of the valve at issue.

DETAILED DESCRIPTION OF THE PREFERRED EMBODIMENTS

Figure 1:
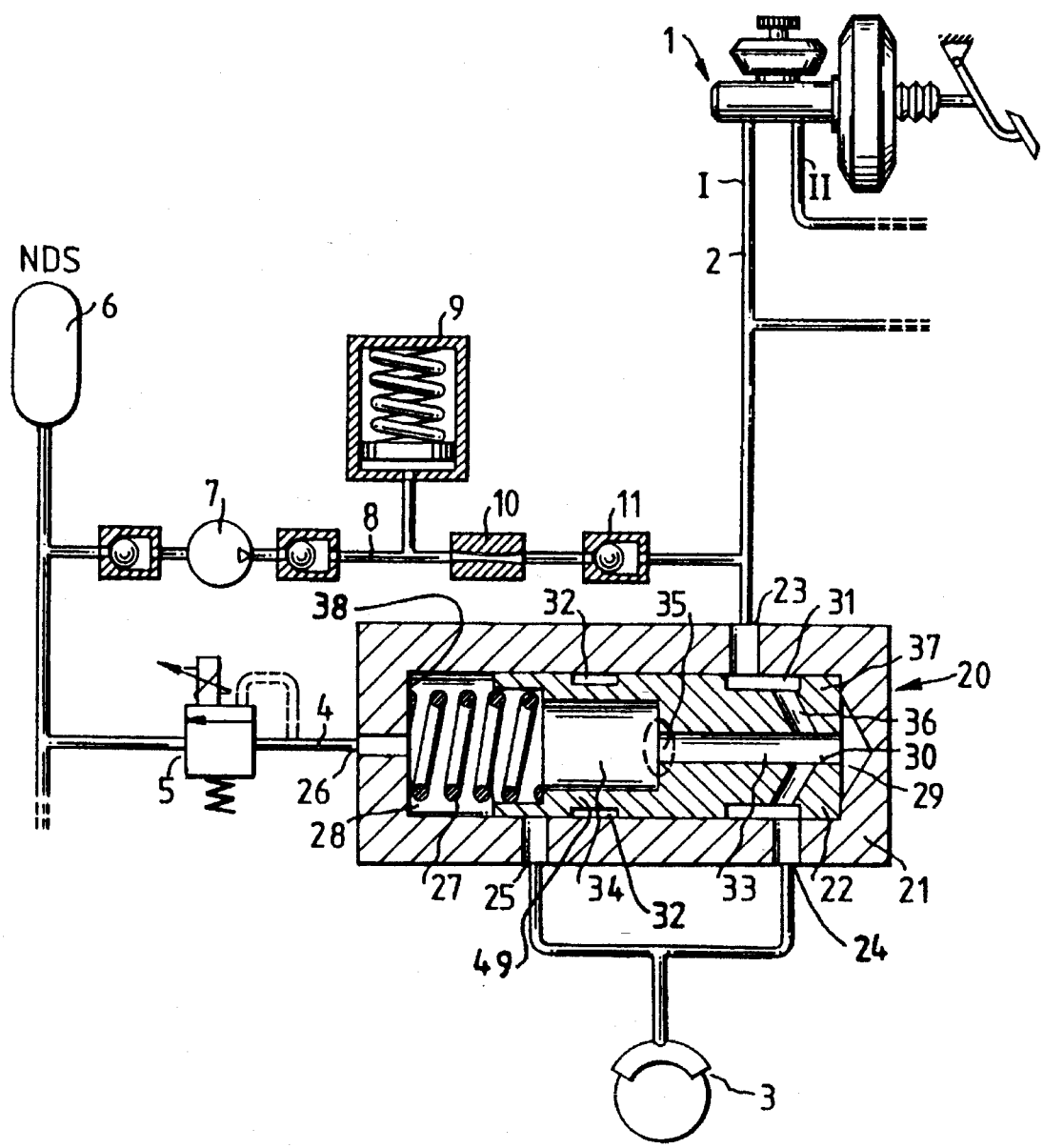
FIG. 1 is a schematic diagram of a first embodiment of the flow control valve of the present invention as it would be employed in a vehicle anti-brake system.

The brake system illustrated in FIG. 1 is composed of a master cylinder 1 to which two brake circuits I, II are connected. The master cylinder 1 is of conventional type of construction and therefore need not be explained in more detail. The allocation of the wheel brakes to the brake circuits I, II is optional, that is it corresponds to one of the usual variants. Therefore, only one brake circuit is shown in the following, the second brake circuit being of a corresponding design.

A wheel brake 3 communicates by way of a brake line 2 with the master cylinder 1. Further, it is in communication with a low-pressure accumulator 6 via a return line 4 into which a proportional pressure limiting valve 5 is inserted. A pump 7 supplies fluid out of the low-pressure accumulator 6 by way of a pressure line 8 into the brake line 2 directly downstream of the master cylinder. In order to prevent pressure surges in the pressure line 8, there is provision of a high-pressure accumulator as a damping accumulator 9 as well as a throttle (or flow restrictor) 10. A non-return valve 11 prevents the damping accumulator 9 from filling during a normal braking operation. The brake line 2 is furnished with a flow control valve 20 which is explained in more detail below.

Flow control valve 20 includes a piston 22 that is sealingly guided in a longitudinal bore 38 formed by walls 39 within housing 21. The housing 21 contains four ports 23, 24, 25, 26. The first port 23 communicates with the master cylinder 1, the second and third ports 24, 25 communicate with the wheel brake 3, the fourth port 26 leads to the proportional pressure limiting valve 5. A spring 27 which is supported within bore 38 of the housing 21, urges the piston 22 in an initial position. The piston 22 subdivides the housing bore into two chambers, namely into an outlet chamber 28 and an inlet chamber 29. In the initial position of the piston 22, the inlet chamber 29 has its smallest volume and the outlet chamber 28 has its largest volume. The two chambers 28, 29 are interconnected by a longitudinal bore 30 through the longitudinal axis of the piston 22. The piston 22 contains on its peripheral surface two annular grooves 31, 32 which are referred to as inlet annular groove 31 and outlet annular groove 32. The mentioned longitudinal bore 30 is composed of two bore portions 33, 34, the first bore portion 33 has a small diameter (relative to bore portion 34), while the second bore portion 34 has a large diameter (relative to bore portion 33). The first bore portion terminates into the inlet chamber 29, while the second bore portion passes over into the outlet chamber 28. The transition from the first bore portion 33 to the second bore portion 34 takes place steplike. This implies that the annular surface in the transition area 35 is disposed vertically to the longitudinal axis of the bore 30. When pressure fluid propagates through the bore 30 from the inlet chamber 29 to the outlet chamber 28, turbulences occur in the steplike transition area 35 which result in a defined pressure gradient between the inlet chamber 29 and the outlet chamber 28 in dependence on the flow speed. Thus the transition 35 acts as a restrictor for the flow control valve 20.

The inlet groove 31 communicates by way of one or more transverse bores 36 with the first small-diameter bore portion 33. The transverse bores 36 can be aligned vertically relative to the axis of the piston, or they may have a slight inclination relative to this axis (the embodiment having a slight inclination is shown in FIG. 1).

The inlet groove 31 is arranged such that in the initial position of the piston 22, both the first port 23 and the second port 24 terminate, with their full cross-section, into the inlet groove 31. Therefore, there is a direct communication, without constriction, between the master cylinder 1 and the wheel brake 3.

The outlet groove 32 which, by way of a transverse bore 49, communicates with the bore portion 34 of larger cross-section does not have a connection to one of the ports in the initial position of the piston 22. Once the piston 22 is displaced in opposition to the force of the spring 27 due to a pressure gradient between the inlet chamber 29 and the outlet chamber 28, the control edge 37 which is adjacent to the inlet groove 31 will move into full overlapping with the second port 24 so that the latter is closed.

Since the first port 23 is offset in relation to the second port 24, the first port 23 is still open in part when the second port 24 is shut off. When the second port 24 is shut off, the outlet groove 32 moves into the overlapping area of the third port 25 so that now a connection is established (by way of bore 49) between the wheel brake 3 and the fourth port 26 to the proportional pressure limiting valve 5. The connection between the first port 23 and the inlet groove 31 is now constricted as a function of the position of the piston 22. In this mode of operation, flow control valve 20 functions as a differential pressure control unit. The position of the piston 22, in turn, is defined by the pressure gradient between the chambers 28 and 29 which ensues from a pressure drop of the flowing medium at the transition area 35. Restrictor and differential pressure generator in conjunction perform the function of a flow control valve so that always a constant pressure fluid flow is attained irrespective of the pressure gradient.

Another important element of the brake system is the outlet valve (or proportional pressure limiting valve 5).

Valve 5 takes the place of an electromagnetically operated two-way/two-position directional control valve which adopts two switch positions, i.e. the open and the closed position. In a two-way/two position control valve, the actuating magnet of the control valve is driven by a pulse-width modulated signal, the ratio of opening time to the closing time being varied. This ratio determines the flow rate. In contrast thereto, the present invention uses a proportional pressure limiting valve 5 that includes a spring-loaded closing member which is exposed to the pressure on the inlet side of the valve 5 (i.e. the pressure at the fourth port 26 in the present case). When the pressure is in a position to overcome the spring force, the valve opens and allows pressure fluid to discharge until the pressure at the inlet drops below the adjusted opening pressure. When the closing member is simultaneously exposed to a magnet force which counteracts the spring force, any opening pressure desired can be adjusted by variation of the magnet force.

Magnets which adjust a magnet force proportionally to the electric current are termed proportional magnets.

Figure 2:
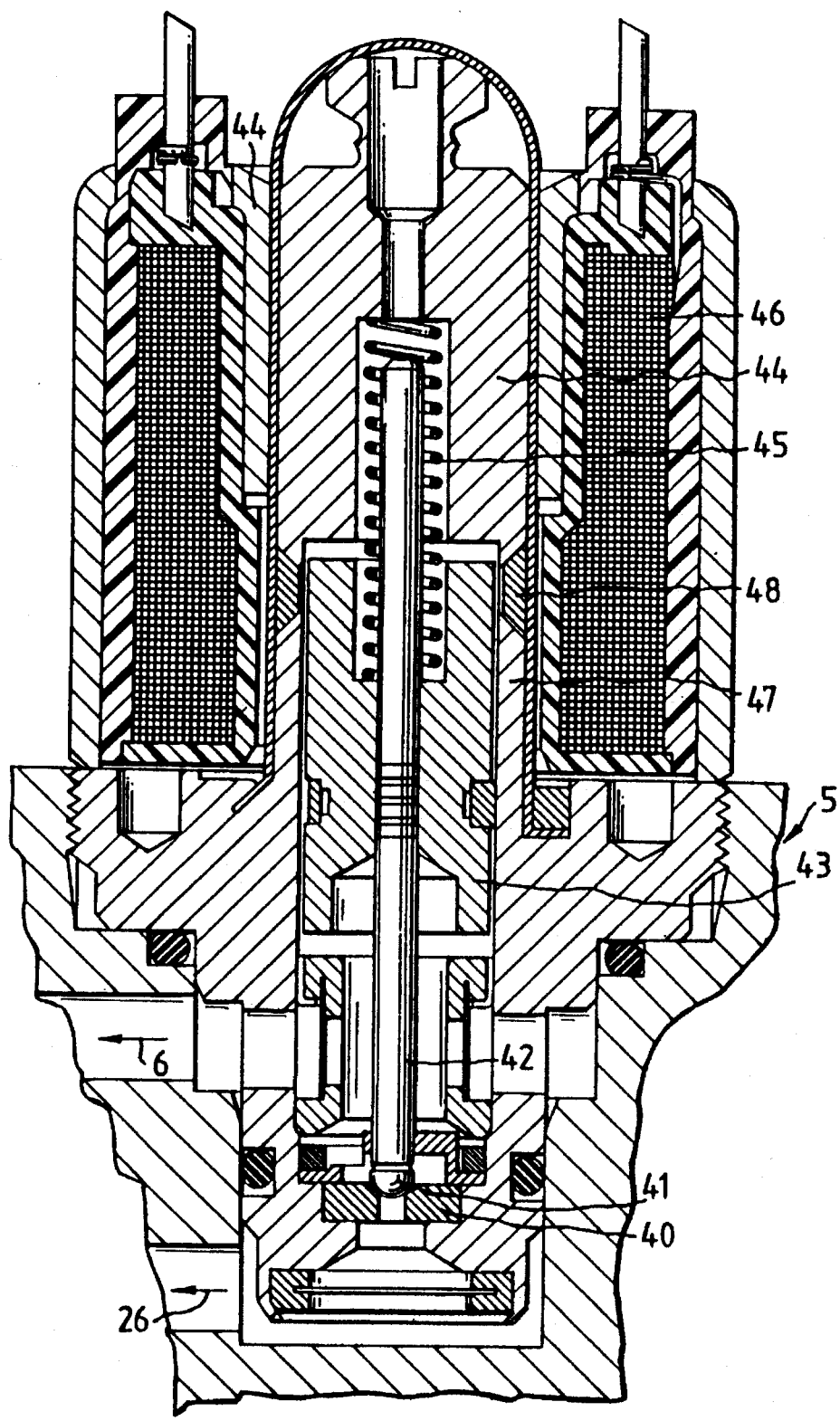
FIG. 2 is a cross sectional view of the proportional pressure limiting valve of the present invention.

The design of a proportional pressure limiting valve is illustrated in FIG. 2. In the bottom part a valve seat 40 can be seen, a chamber beneath the valve seat 40 leading to the fourth port 26 and thus to the wheel brake, while a chamber above the valve seat is connected to the low-pressure accumulator 6. A spherical valve member 41 is seated on the valve seat and is coupled to a tappet 42. Tappet 42 extends centrally through, and is connected to, a piston-shaped armature 43. Arranged above the armature 43 is a pole shoe 44 with a recess into which the armature 43 resides. There is an axial distance between the armature 43 and the pole shoe 44, while there is a radial distance between the armature 43 and the edge of the recess. Further, a spring 45 is disposed between the pole shoe and on the armature.

The armature is encompassed by a guide sleeve 47, a radial gap being formed between the armature 43 and the guide sleeve 47. A gap 48 is likewise formed between the pole shoe 44 and the guide sleeve 47. A coil 46 encompasses the pole shoe 44 and the armature 43 and the guide sleeve 47.

The spring 45 keeps the valve member 41 on the valve seat 40 so that the connection between the port 26 and the low-pressure accumulator 6 is interrupted. The spring force is adjusted such that the maximally achievable braking pressure is not able to lift the valve member 41 from the valve seat 40.

Once the coil is connected to a current-generating system, the current circulating through the coil 46 will cause a magnetic flux through the armature 43. The magnetic flux pulls the armature 43 into the coil system, and a force irrespective of the stroke can be adjusted by the axial air gap and the radial air gap being properly conformed to each other. The force acting on the armature 43 will then depend on the current intensity only which is applied to the coil 46. The engineering of the proportional magnets is well known and need not be explained in more detail herein. To supply the coil 46 with a constant current, a voltage-current transducer can be provided which serves as a power amplifier and impresses on the magnet a current proportional to the input voltage. A circuit is also possible which generates a constant current on the basis of pulse-width modulated voltage signals.

The brake system described in FIGS. 1 and 2 operates as follows. A braking operation is initiated by depressing the symbolically illustrated pedal. Pressure fluid flows from the master cylinder 1 via the port 23, the inlet groove 31 and the second port 24 to the wheel brake 3. Hence pressure develops in the brake circuit which results in wheel deceleration and, eventually, in deceleration of the vehicle.

The rotational behaviour of the wheel is monitored during a braking operation by non-illustrated sensors. Once the connected evaluating electronics detects that there is an imminent danger of wheel lock, it generates a current signal or, respectively, voltage signal for the proportional pressure limiting valve 5 and sets the pump 7 to operate.

The opening pressure of the valve 5 is decreased and now ranges below the instantaneous braking pressure.

The pressure fluid discharging from the outlet chamber 28 causes pressure fluid to replenish out of the inlet chamber 29 or the wheel brake 3, respectively. The pressure gradient ensuing at the transition area 35 causes displacement of the piston 22 so that, as has been explained already, the second port 24 will be closed and the third port 25 will be opened. The wheel brake 3 is now in communication with the bore portion 34 downstream of the transition area 35. The port 23 is throttled by the control edge 37 to such extent that, in conjunction with the pressure gradient at the transition area 5, a constant pressure fluid flow from the port 23 to the port 25 and 26, respectively, results.

By way of the proportional pressure limiting valve 5, an amount of pressure can be adjusted in the wheel brake 3 which is proportional to the magnitude of the current through the magnet coil 46. The latter coil is set such that the wheel exhibits an amount of slip permitting to transmit both maximal longitudinal forces and lateral guidance forces on the wheel. The pressure fluid discharging via the proportional pressure limiting valve 5 is received by the low-pressure accumulator 6 and is returned by the pump 7 into the brake circuit.

Since the signal for the proportional pressure limiting valve 5 is proportional to the pressure in the wheel brake, a learning circuitry can be installed in the evaluating unit which results in an improvement of the control quality. The speed of pressure decrease and pressure increase, respectively, can be caused by a correspondingly slow or fast variation of the coil current so that any desired pressure-reducing gradients or pressure-increasing gradients, respectively, can be adjusted.

A proportional pressure limiting valve 5 can be employed on any type of anti-lock brake systems. Yet particular advantages are accomplished in conjunction with a flow control valve.

Figure 3:
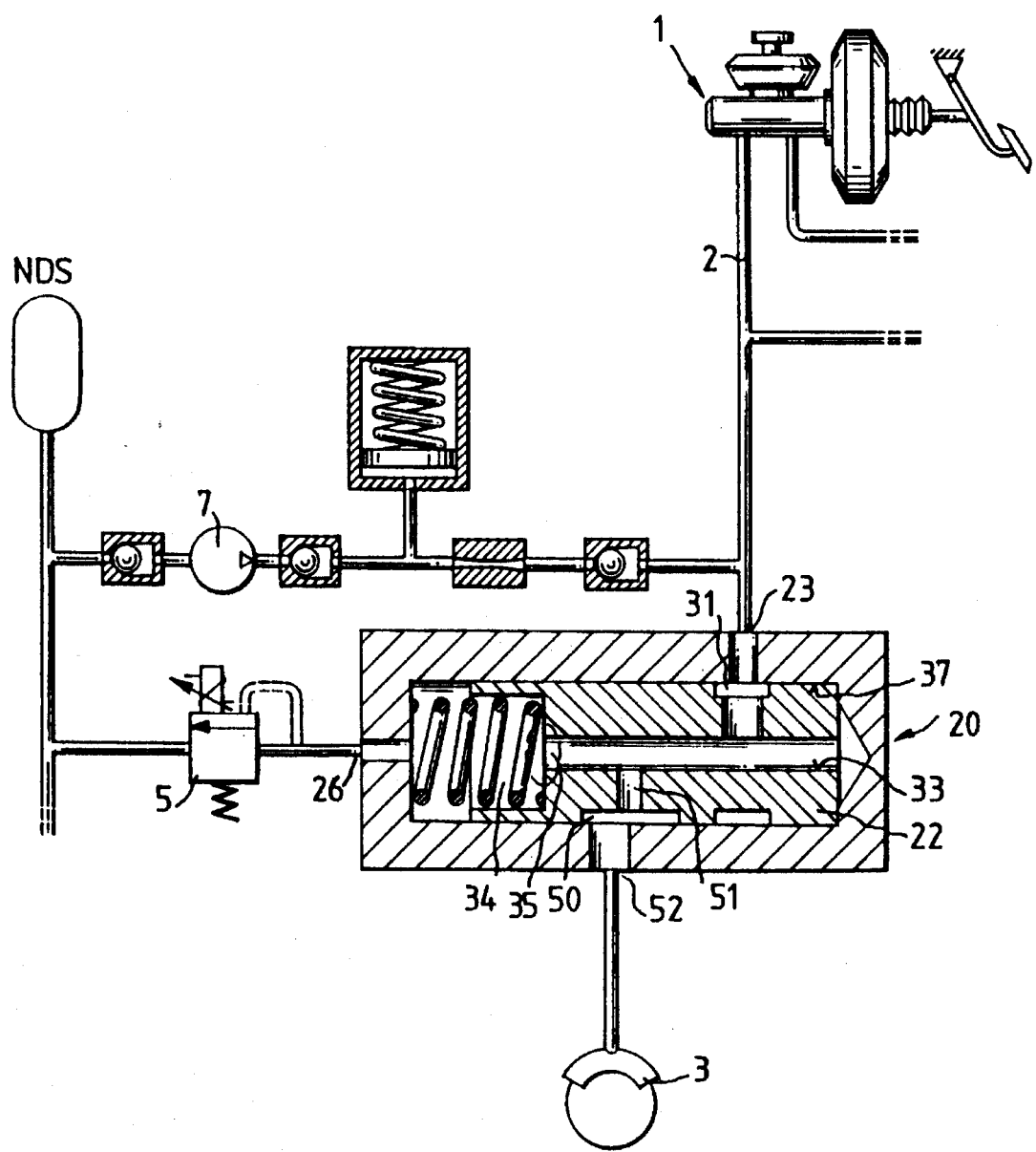
FIG. 3 is a second embodiment of the flow control valve of the present invention.

The embodiment according to FIG. 3 shows a somewhat different design for the flow control valve 20. In all other respects the design of the brake system is identical with that according to FIG. 1 so that there is no need to explain this system herein.

The flow control valve 20 according to FIG. 1 is de-signed such that in the control position of the piston 22, the wheel brake 3 connects downstream of the transition area 35, that is between the transition area 35 and the fourth port 26.

The second embodiment of the flow control valve of the present invention is depicted in FIG. 3. This embodiment is designed such that even if the piston 22 moves to assume the control position, the wheel brake is connected upstream of the transition area 35. To this end an annular groove 50 is provided which communicates via a transverse bore 51 with the first area 33 of the longitudinal bore in the piston 22. The wheel brake 3 is in constant communication with the annular groove 50 and, that is to say, irrespective of the position of the piston 22. The inlet groove 31 does no longer have a direct connection to the wheel brake, it merely serves to throttle the first port 23 by means of its control edge 37.

Figure 4:
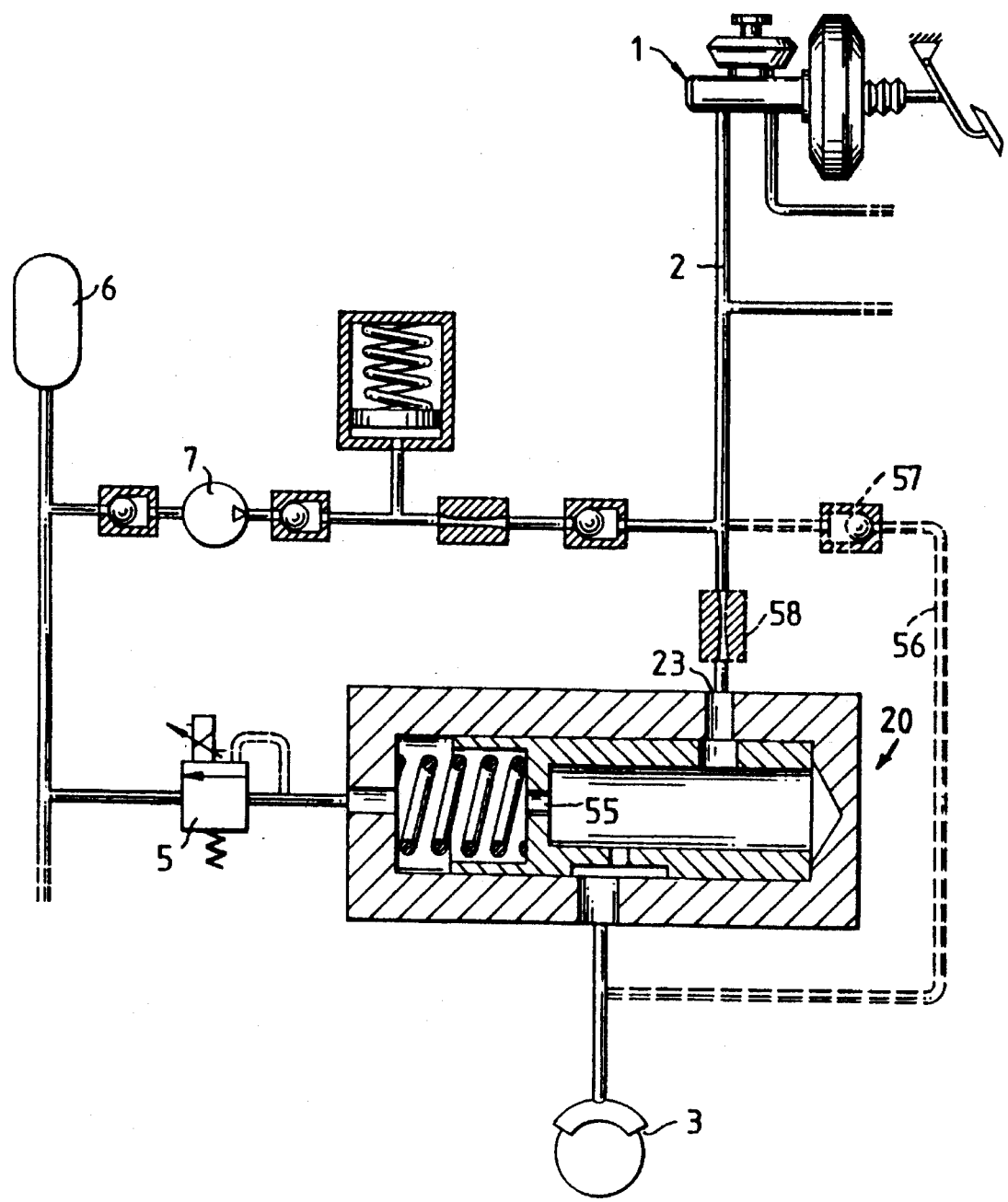
FIG. 4 is a third embodiment of the flow control valve of the present invention.

The third embodiment of flow control valve of the present invention is depicted in FIG. 4. The embodiment of FIG. 4 corresponds to that of FIG. 3, except a restrictor 55 is provided instead of an abrupt cross-sectional expansion. What is termed as "restrictor" herein is an abrupt cross-sectional constriction with a subsequent abrupt cross-sectional expansion, with the length of the cross-sectional constriction being relatively small.

A pressure variation in dependence on the flow speed takes place both on the restrictor 55 and on the cross-sectional expansion 35. Both perform the function of a restrictor for the flow control valve 20.

FIG. 4 shows a bypass line 56 with a non-return valve 57. This arrangement limits the pressure in the wheel brake 3 to that of the master cylinder pressure. It also bypasses throttle 58 during pressure decrease to ensure an unimpeded flow of fluid from wheel brake 3 to master cylinder 1. This measure can be made use of in all brake systems being presented in this application. In all other Figures, this illustration has been dispensed with for the sake of clarity. The same applies to an additional throttle 58 on the first port 23 in order to ensure limitation of the pressure increase gradient during a normal braking operation.

As explained already in the embodiments of FIG. 1 and 3, a constant pressure fluid flow at the flow control valve is caused during a brake slip control operation. However, because the wheel brake 3 always connects upstream of the restrictor 55, the following advantages result. The flow of fluid discharging via the pressure limiting valve 5 consists of the pressure fluid flow emanating from the master cylinder 1 or the pump 7, respectively, and of the pressure fluid flow out of the wheel brake 3. The pressure fluid flow out of the wheel brake 3 is thus not superimposed on the fluid flow adjusted by the flow control valve, but forms part of the controlled pressure fluid flow. Therefore, less pressure fluid must be replenished and less pressure fluid must be discharged by way of the proportional valve 5. This all results in a design having a reduced opening at the proportional valve 5 and, accordingly, designs requiring reduced pump capacity.

Special advantages result in that during a quick pressure decrease the piston 22 is displaced to the left so far that the port 23 will be closed completely. Due to this no pressure fluid can be replenished so that the pressure in the wheel brake decreases rapidly. On the other hand, during quick pressure increases, the piston 22 is displaced so far to the right that the port 23 is throttled no more, the pressure fluid being permitted to replenish unhinderedly as a result.

Therefore, an augmented pressure fluid flow results at the first port 23 during pressure increase so that a quick pressure increase can take place. Any pressure desired can be adjusted in the wheel brake by means of the proportional pressure limiting valve 5.

Figure 5:
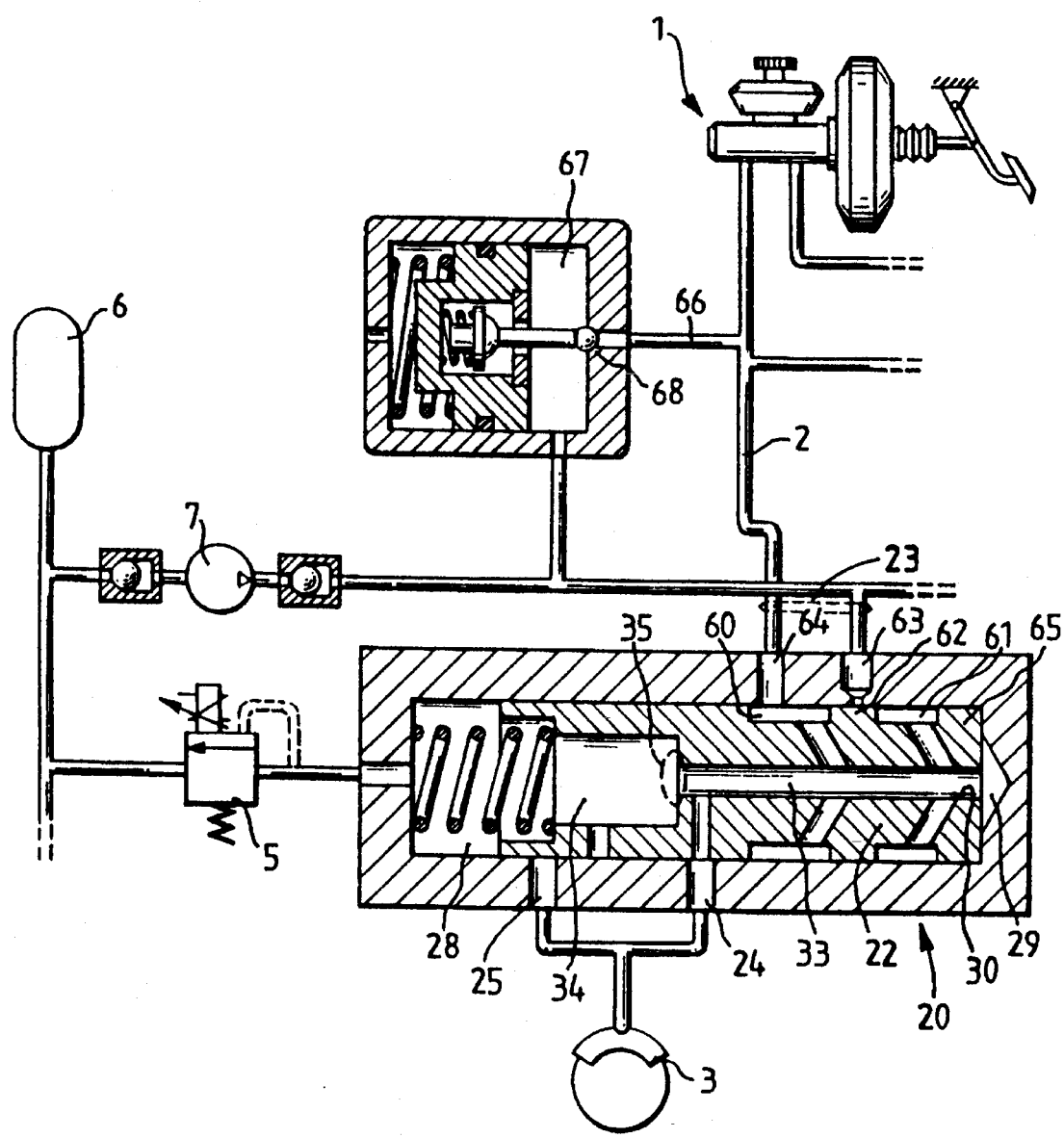
FIG. 5 is a fourth embodiment of the flow control valve of the present invention.
Figure 6:
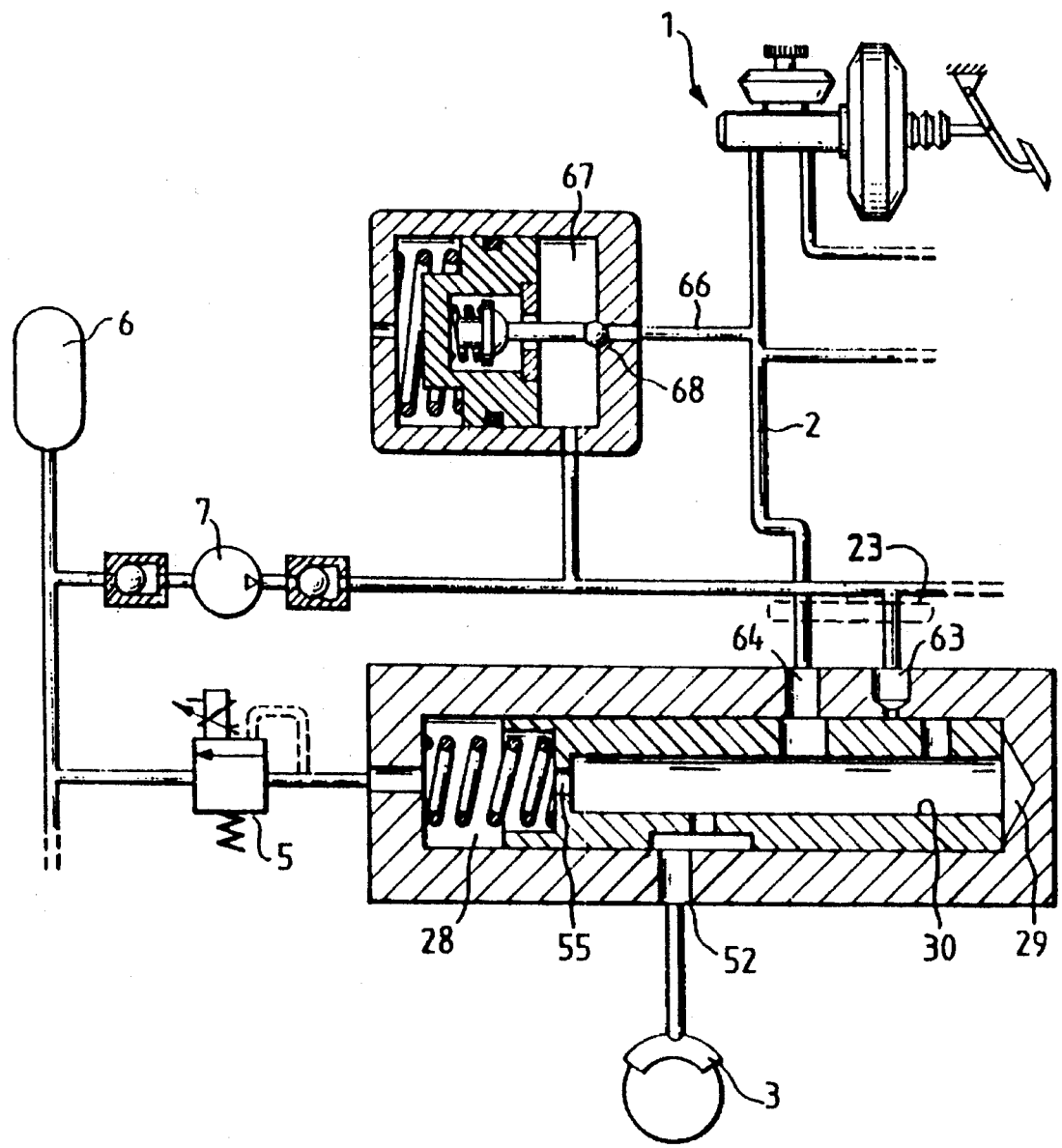
FIG. 6 is a fifth embodiment of the flow control valve of the present invention.

FIGS. 5 and 6 will be described hereinbelow. The brake systems and flow control valves 20, respectively, described therein are largely identical with the embodiments according to FIGS. 1, 3 and 4. Therefore, only the differences will be referred to in the following.

Piston 22 is provided which slides in a longitudinal bore 38 of housing 21. Bore 38 confines with its end surfaces an outlet chamber 28 and an inlet chamber 29. The two chambers are interconnected through a central longitudinal bore 30 of piston 22. Bore 30 has either a transition area 35, as is illustrated in FIG. 5, or a restrictor 55, as is illustrated in FIG. 6.

The connection from the flow control valve, 20 to the wheel brake 3 follows either the design according to FIG. 1 or the design according to FIG. 3.

The design of FIG. 5 follows that of FIG. 1 (e.g. the wheel brake is furnished with two ports 24, 25 which are switched over as soon as the piston 22 leaves its initial position and displaces to assume the control position). In the initial position the wheel brake 3 communicates with the bore portion 33 upstream of the transition area 35 and upstream the restrictor 55, respectively, while in the control position it communicates with the bore portion 34 downstream of the transition area and downstream of the restrictor 55, respectively.

The design according to FIG. 6 follows the embodiment according to FIG. 3. The wheel brake is provided with a single connection 52 which, irrespective of whether the piston 22 is in the initial position or the control position, is always in communication with that portion of the longitudinal bore 30 which is arranged upstream of the transition area 35 and upstream of the restrictor 55, respectively.

The difference over the previous embodiments resides in that the first port 23 is subdivided into a master cylinder port 64 and a pump port 63. The master cylinder port 64 is connected solely to the master cylinder 1, while the pump port 63 communicates with the pump 7. The ports 63, 64 correspond with annular grooves 60, 61 in the peripheral surface of the piston 22 which, in turn, connect by way of transverse bores to the bore 30 upstream of the transition area 35 and the restrictor 55, respectively. The grooves 60, 61 are isolated from each other by a web 62. In the initial position of the piston 22, the master cylinder port 64 is connected with the first groove 60, while the pump port 63 is closed by the web 62.

When the piston 22 is displaced to the left during a braking pressure control operation according to the illustration, the web 62 will close the master cylinder port 64, while the web 65 which confines the other side of the second groove 61 closes the pump port 63 in part.

Thus, during a control operation, the master cylinder is uncoupled from the brake circuit, and merely the pressure fluid flow emanating from the pump 7 is controlled at the port 63.

Those advantages which have been described in respect of FIG. 4 result in this embodiment, too. Both ports 63, 64 will be closed upon a quick pressure decrease. In the event of a quick pressure increase the port 64 will be opened in an unthrottled manner.

However, the uncoupling of the master cylinder is not complete. This is because if the delivery rate of the pump 7 is reduced because of insufficient pressure fluid at its suction side a reduction of the pressure gradient results at the transition area 35 and the restrictor 55, respectively. The piston moves to the right according to the drawing and releases the master cylinder port 64 so that now additional pressure fluid can replenish out of the master cylinder and the balance of flow quantities is reached.

In the event that the pump delivers more fluid than can enter by way of the port 63 into the flow control valve, a direct line 66 is provided which connects the pressure side of the pump 7 to the master cylinder. This line connects to an accumulator 67 and is furnished with a shut-off valve 68. The valve member of the valve 68 is coupled with the piston of the accumulator 67 so that starting from a defined degree of admission of the accumulator the shut-off valve 68 will open and the quantity of pressure fluid which is not received by the accumulator will flow to the master cylinder. The absorptive volume of the accumulator 67 need not be very large since it merely serves to receive surplus pressure fluid which would produce pressure peaks due to pump pulsation.

The embodiments of FIG. 5 and 6 serve to isolate the master cylinder circuit from the pump circuit (the master cylinder and pump being each furnished with a connection to the flow control valve 20). This, in turn, serves to diminish reactions of the control operations to the pedal. During a braking pressure control operation, the pedal substantially maintains that position which it had assumed at the commencement of the control. The effect is termed as "motionless pedal."

As explained before, the embodiment according to FIG. 6 corresponds to the embodiment according to FIG. 5, it likewise comprises a master cylinder port 64 and a pump port 63. Instead of a transition area 35 a restrictor 55 is provided in the bore 30.

The wheel brake is always connected upstream of the transition area 35 or the restrictor 55, respectively.

Figure 7:
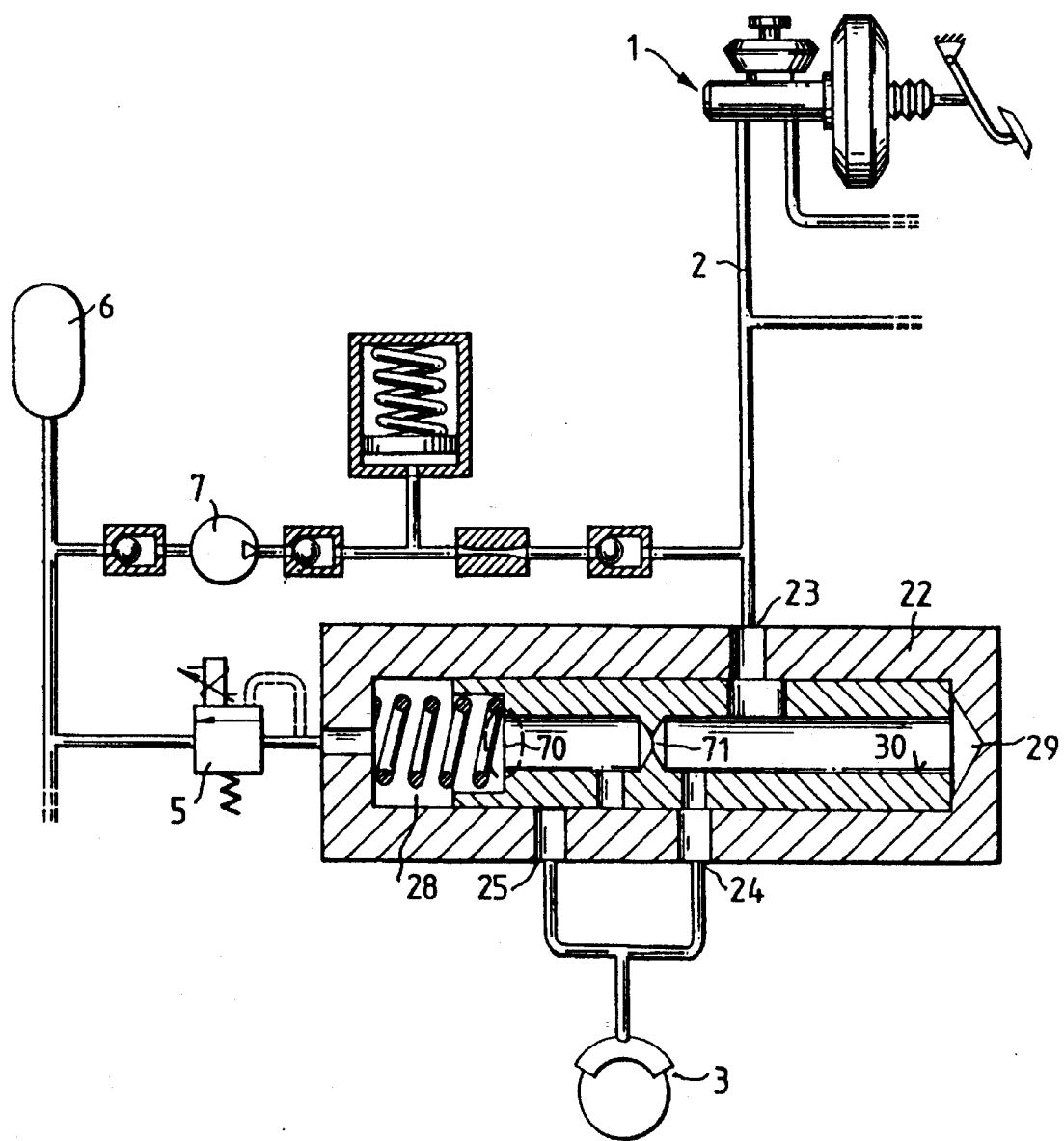
FIG. 7 is a sixth embodiment of the flow control valve of the present invention.
Figure 8:
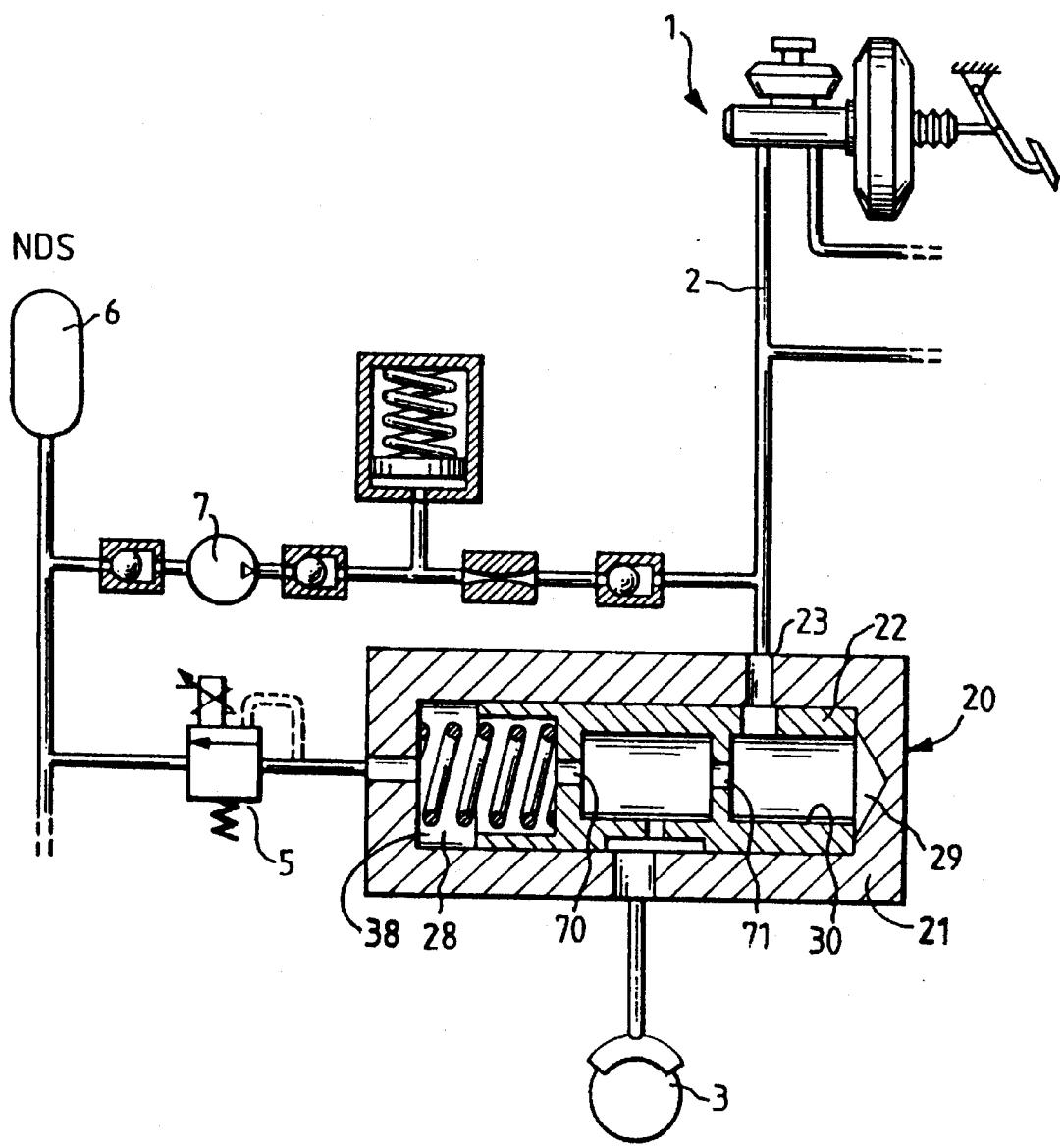
FIG. 8 is a seventh embodiment of the flow control valve of the present invention.

Two additional embodiments are presented in FIGS. 7 and 8 which shall now be explained. The basic idea resides in that the restrictor is formed of two single restrictors, with the connection of the wheel brake in the control position of the piston 22 being interposed between the two restrictors.

The design of the brake system according to FIGS. 7 and 8 corresponds to the design of the brake system according to FIGS. 1 and 3, respectively.

A piston 22 is sealingly guided in a bore and isolates the inlet chamber 29 from the outlet chamber 28. The longitudinal bore 30 comprises two restrictors, that is a first restrictor 70 and a second restrictor 71. According to the design of Figure 7, the first restrictor is realised as an abrupt expansion similar to the illustration of FIG. 1, while the second restrictor is realised as a cross-sectional constriction similar to the illustration of FIG. 6.

FIG. 8 depicts both restrictors as cross-sectional constrictions. Other combinations are possible.

In FIG. 7 the wheel brake is furnished with two ports 24, 25, the port 24 connecting to the bore portion upstream of the second restrictor in the initial position of the piston, while the wheel brake is connected to the area between the first and the second restrictor in the control position.

In FIG. 8 solely one port is provided for the wheel brake which, irrespective of the position of the piston 22, is in permanent connection with the portion of the bore 30 between the two restrictors.

The flow control valve 20 is in each case furnished with a first port 23 to which both the master cylinder and the pump connect. Naturally a double port can also be provided in the embodiments according to FIGS. 7 and 8, as described in FIGS. 5 and 6, respectively.

Any configuration as is shown in this application can be employed as a restrictor configuration. For instance, two abrupt expansions can be provided.

The following mode of function results when two restrictors are used. During pressure decrease, pressure fluid discharges from the outlet chamber 28 which, substantially, is replaced by pressure fluid out of the wheel brake. Replenishment supply of fluid out of the inlet chamber 29 is impeded by the second restrictor 71. From this, a relatively great pressure gradient results between the chambers 28 and 29, whereby the piston 22 is displaced and the first port 23 is closed. During the pressure decrease mode, only a small amount of pressure fluid can flow by way of the first port 23 so that the pressure decrease (within wheel brake 3) can take place relatively quickly. Therefore, only that quantity of pressure fluid is required to discharge via the pressure-limiting valve 5 which emanates from the wheel brake 3.

The very opposite occurs during pressure increase. The pressure limiting valve 5 is set to a higher pressure (than that effective during pressure decrease). This higher pressure becomes effective in the outlet chamber 28 and urges the piston 22 to the right, the first port 23 being opened completely as a result. Pressure fluid can now flow through the second restrictor 71 into the wheel brake. Because the pressure decrease in the wheel brake does not instantaneously become effective in the outlet chamber 28, the piston 22 remains in a position in which the port 23 is open so that a quick pressure increase can take place. The pressure increase gradient is solely dictated by the dimensioning of the second restrictor 71.

Figure 9:
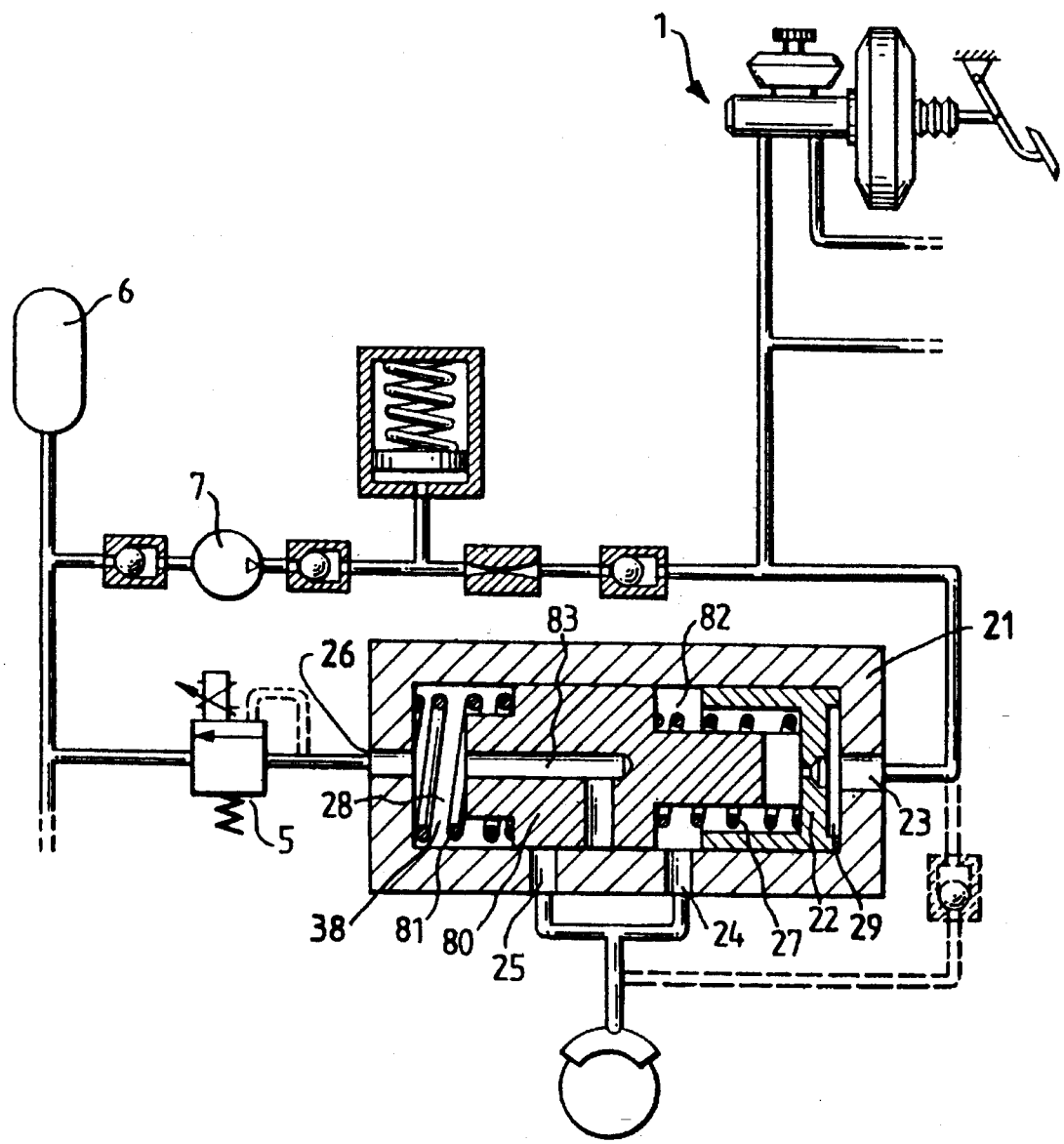
FIG. 9 is an eight embodiment of the flow control valve of the present invention.
Figure 10:
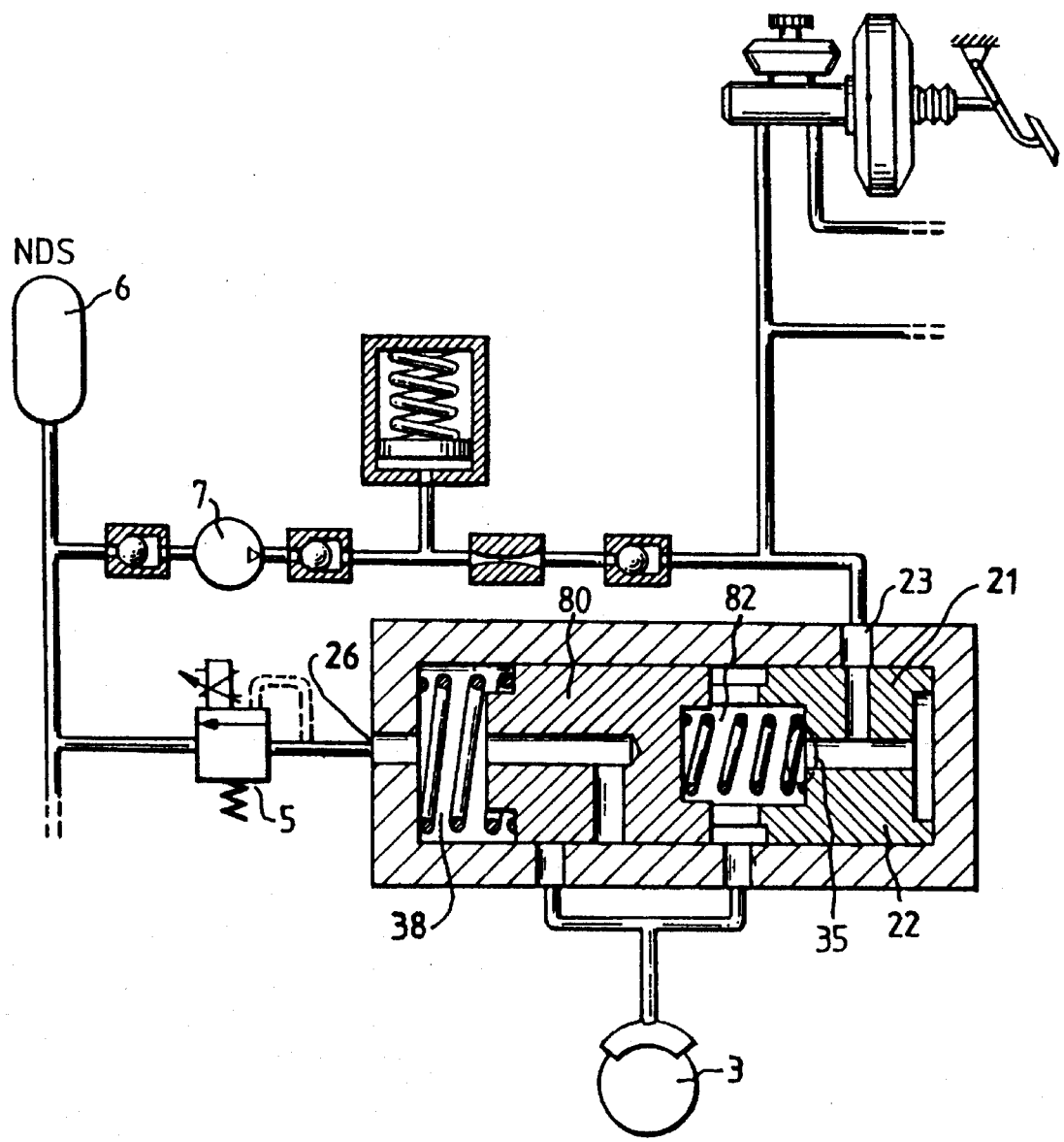
FIG. 10 is a ninth embodiment of the flow control valve of the present invention.

An eighth and ninth embodiment of the control valve of the present invention is shown in FIGS. 9 and 10. As has been explained already in detail, the flow control valve 20 comprises a piston 22 (which shall be termed as flow control valve piston in the following) which is confined to longitudinal bore 38 of housing 21. A retaining piston 80 is also arranged in bore 38. Piston 80 is supported on the flow control valve piston 22. A spring is interposed between the pistons 80, 22 which, in its mode of effect, corresponds to the spring 27 according to FIG. 1. Another spring 81 is arranged between the bottom of the housing bore and the retaining piston 80 which keeps the retaining piston 80 in abutment on the flow control valve piston 22. Thus the housing bore 38 accommodates three chambers, an inlet chamber 29 which is confined by the flow control valve piston 22, an intermediate chamber 82 between the pistons and an outlet chamber 28 bounded by the retaining piston 80. The master cylinder and the pump, respectively, connect to the inlet chamber 29 by way of port 23. The second port 24 terminates into the intermediate chamber 82, a third port 25 is connectable with the outlet chamber 28. The latter, in turn, is in communication with the outlet valve 5 by way of a fourth port 26. The retaining piston 80 keeps the third port 25 closed in the illustrated initial position. Once the retaining piston 80 is displaced in opposition to the force of the spring 81, the third port 25 will connect to the outlet chamber 28 via a channel system 83 in the retaining piston 80.

As explained already, the flow control valve piston 22 either includes a cross-sectional constriction (FIG. 9) or a spontaneous cross-sectional expansion (FIG. 10).

When the flow control valve piston 22 displaces, according to FIG. 9 the second port 24 to the wheel brake will narrow down due to the piston 22, while in FIG. 10 the first port 23 will be constricted as is known already from the previous embodiments.

The retaining piston 80 is used to prevent the inadvertent movement of piston 22 during normal braking operation. In the embodiments of FIGS. 1–8, in the event that the pressure increase takes place through the restrictor of the flow control valve during a normal braking operation, a pressure gradient can form at the invariable restrictor, and the flow control valve will be set to function inadvertently. However, in the embodiments of FIGS. 9 and 10, the flow control valve piston 22 will be kept in its initial position by the spring-loaded retaining piston so that it cannot start its control function.

Yet in a control operation the outlet valve or, respectively, proportional pressure limiting valve 5 is opened, as has been explained already, so that pressure fluid can discharge from the outlet chamber 28. The spring 27 urges the retaining piston to the left according to the drawing, the connection between the third port 25 and the fourth port 26 being opened. The wheel brake is now in direct connection with the proportional pressure limiting valve 5. The retaining piston 80 has detached from the flow control valve piston 22 so that the piston 22 can perform its purpose of function.

The retaining piston 80 remains in its displaced position during the entire duration of the control. It returns into its initial position upon termination of the control, while pressure fluid enters the chamber 28 via small leakages in the piston seal of the retaining piston 80. In case of need, the proportional pressure limiting valve 5 can be arranged to open for a short time.

Figure 11:
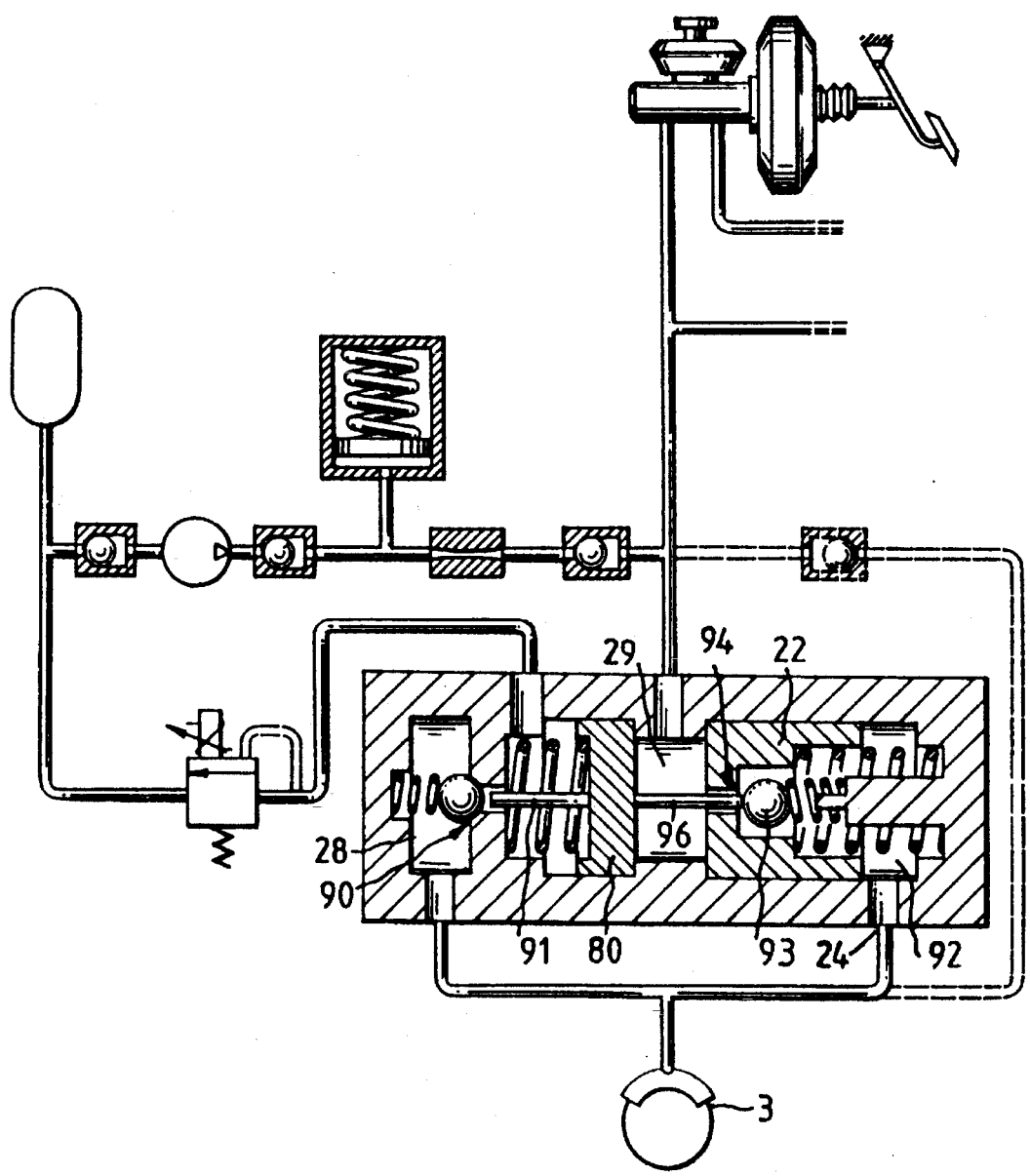
FIG. 11 is a tenth embodiment of the flow control valve of the present invention.

A tenth embodiment of the control valve of the present invention is disclosed in FIG. 11. The embodiment of FIG. 11 likewise exhibits a flow control valve 20 which is set to become inactive during a normal braking operation. A retaining piston 80 is provided for this purpose which bounds the outlet chamber 28 with its one front face and the inlet chamber 29 with its other front face. The connection between the third port 25 and the outlet chamber 28 takes place via a seat valve 90 which is operated via a tappet 91 on the retaining piston 80. When the pressure in the outlet chamber 28 is decreased by opening of the proportional pressure limiting valve 5, the master cylinder pressure will urge the retaining piston 80 to the left in opposition to the force of a spring according to the drawing, and the valve 90 will be opened and a direct connection will be established between the wheel brake and the proportional pressure limiting valve 5.

Adjacent to the inlet chamber 29 is the flow control valve piston 22 which, with its other front face, confines another chamber 92 being in communication with the wheel brake via a second port 24. The piston 22 accommodates a central bore onto which a valve ball 93 can be seated. The sealing seat includes a notch or recess 94 which, if the valve ball 93 is seated on the valve seat, permits a throttled flow connection between the inlet chamber 29 and the further chamber 92. The notch 94 forms the restrictor.

The piston 22 is movable in opposition to the force of a spring and, in doing so, closes the second port 24. Piston 22 and port 24 form the differential pressure control unit. A flow control function is the result.

The retaining piston 80 is provided with another tappet 96 which is movable into abutment on the valve ball 93. In the initial position of the flow control valve piston 22 and in the inactive position of the retaining piston 80, the further tappet 96 keeps the valve ball 93 remote from the valve seat, thereby permitting an unthrottled connection through the mentioned bore.

Once the retaining piston 80 moves from the inactive position, the valve ball 93 will move to sit on the valve seat so that the notch 94 becomes effective and the flow control function can start.

Figure 12:
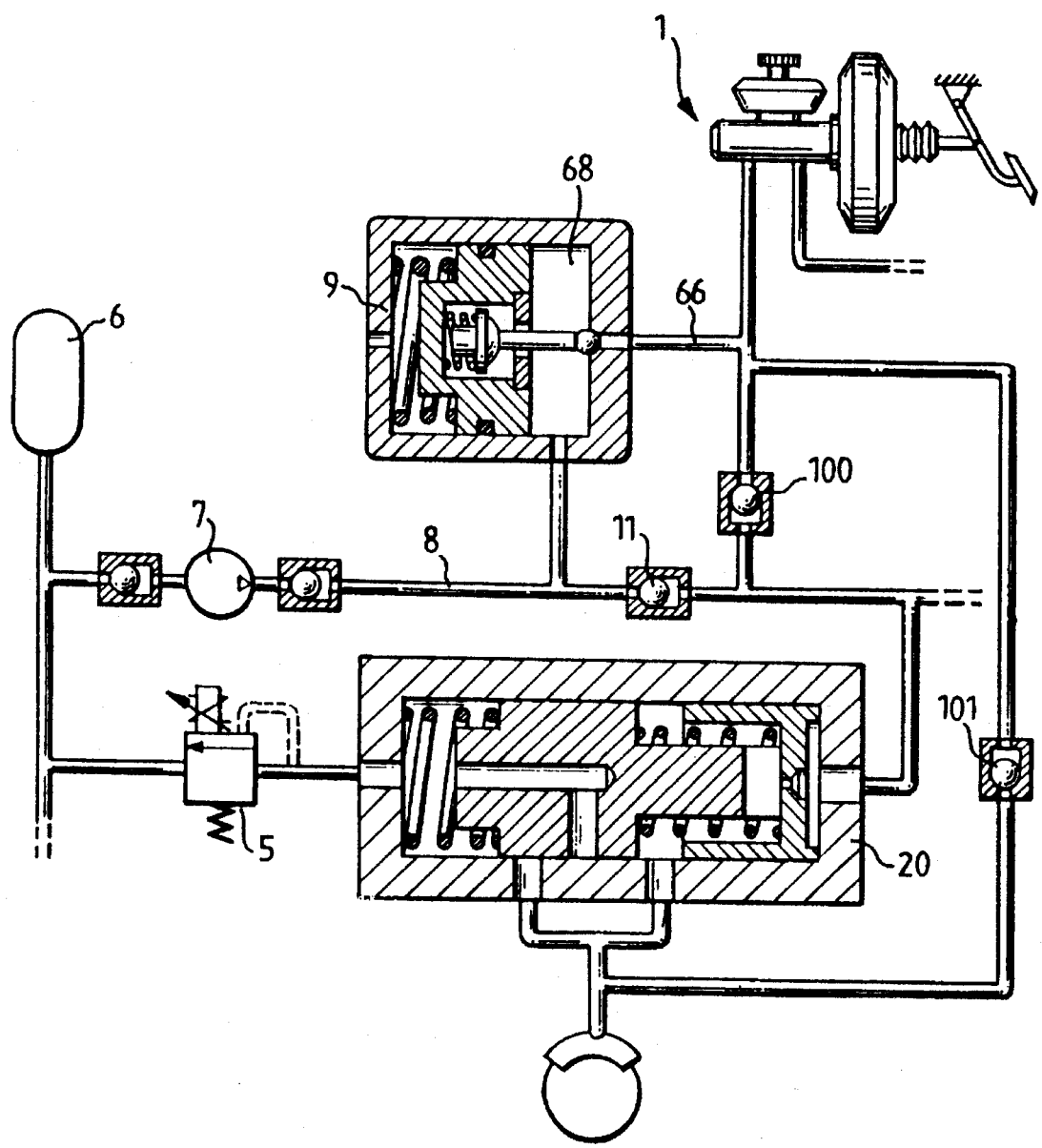
FIG. 12 is an eleventh embodiment of the flow control valve of the present invention.

FIG. 12 discloses an eleventh embodiment of the control valve of the present invention. The flow control valve corresponds to the illustration according to FIG. 9, however, any of the flow control valves of the previous Figures can be employed. It is important that a first non-return valve 100 closing towards the master cylinder is inserted into the brake line, namely between the master cylinder 1 and the point where the pressure line 8 terminates into the brake line. A second non-return valve 101 connects the wheel brake to the master cylinder 1, the non-return valve opening towards the master cylinder. A high-pressure accumulator 9 connects to the pressure line 8. Like in FIG. 1, the said accumulator is secured by a non-return valve 11 so that the high-pressure accumulator will not be filled with fluid in the event of a normal braking operation.

A constant flow of pressure fluid supplied by the pump is adjusted by the flow control valve 20. Since herein a rotary piston pump is at issue in general, the pump capacity is subjected to slight variations so that pressure peaks cannot be avoided. These are meant to be minimized by the high-pressure accumulator 9. The non-return valve 100 prevents the propagation of pressure fluid from the pump into the master cylinder so that the pedal remains motionless during a control operation. See the explanation in respect of FIGS. 5 and 6. The high-pressure accumulator can be furnished with a shut-off valve 68 which opens a direct line 66 to the master cylinder. The valve 68 is operated by the piston of the high-pressure accumulator so that the direct line will be opened once the high-pressure accumulator has reached a certain charging volume. The advantage is that the maximum absorptive volume of the accumulator can be kept small since surplus pressure fluid is conveyed into the master cylinder.

During a normal braking operation, the pressure increase takes place by way of the first non-return valve 100 and the pressure decrease takes place by way of the second non-return valve 101.

Thus, a pressure limiting function is obtained by means of the shut-off valve 68. The pressure in the line 8 is limited to the value at which the valve 68 opens.

In the absence of a like valve, the pressure cannot rise at option nevertheless, since the delivery rate of the pump reduces with rising pressure until it has reached a value which corresponds to the flow rate of the flow control valve.

All embodiments are illustrated with a proportional pressure limiting valve 5 in the outlet line. This pressure limiting valve serves to adjust an evenly discharging pressure fluid flow. Thus, in combination with a flow control valve in the supply line, a low-vibration control behaviour and, in total, a noise-minimized system is obtained. Principally, the proportional pressure limiting valve can be replaced by a two-way/two-position solenoid valve which is operated in a pulse-width modulated manner.

The improved noise behaviour which is accomplished by the combination of a proportional pressure limiting valve and a flow control valve can be improved still further by the measure according to FIG. 12, while simultaneously a motionless pedal behaviour during a control operation is attained.

We claim:

1. An anti-lock brake system, comprising:
   a master cylinder;
   a wheel brake;
   a brake line connecting said master cylinder to said wheel brake;
   a flow control valve placed in said brake line between said master cylinder and said wheel brake, said control valve including a housing, said housing having an internal bore with a first longitudinal wall and a second longitudinal wall, wherein an inlet port, a first brake port, a second-brake port, and an outlet port extend from an outer surface of said housing to said internal bore, a retaining piston disposed in said bore, an outlet chamber defined between said retaining piston and said housing, a return valve selectively connecting said second brake port with said outlet port, a flow control valve piston disposed in said internal bore, a face of said control valve piston and one of said retaining piston and said second longitudinal wall of said housing defining an inlet chamber therebetween, said inlet chamber including said inlet port, an opposing face of said control valve piston and one of said retaining piston and said second longitudinal wall of said housing defining an intermediate chamber therebetween, said intermediate chamber including said first brake port.

2. An anti-lock brake system as disclosed in claim 1, wherein said first brake port and said second brake port are directly interconnected by way of an unobstructed channel disposed between said housing and said wheel brake.

3. An anti-lock brake system as disclosed in claim 2, wherein said outlet chamber includes said outlet port and said second brake port.

4. An anti-lock brake system as disclosed in claim 3, wherein a first spring is disposed between a face of said retaining piston and said first longitudinal wall of said housing to bias said retaining piston away from said first longitudinal wall such that said return valve is closed.

5. An anti-lock brake system as disclosed in claim 4, wherein a second spring is disposed in said intermediate chamber between said opposing face of said flow control valve piston and said one of said retaining piston and said second longitudinal end of said housing to bias said flow control valve piston away from said first brake port.

6. An anti-lock brake system as recited in claim 1, further including an electromagnetically operated outlet valve in said return line, said outlet valve positioned away from said housing.

7. An anti-lock braking system as recited in claim 1, wherein a throttling mechanism allows at least limited fluid flow between said inlet chamber and said intermediate chamber.

8. An anti-lock brake system, comprising:
   a master cylinder;
   a wheel brake;
   a brake line connecting said master cylinder to said wheel brake;
   a flow control valve placed in said brake line between said master cylinder and said wheel brake, said control valve including a housing, said housing having an internal bore with a first longitudinal wall and a second longitudinal wall, wherein an inlet port, a first brake port, a second brake port, and an outlet port extend from an outer surface of said housing to said internal bore, a retaining piston disposed in said bore, an outlet chamber defined between said retaining piston and said first longitudinal wall of said housing, said outlet chamber including at least said outlet port, a return valve selectively connecting said second brake port with said outlet port, a first spring disposed between a face of said retaining piston and said first longitudinal wall of said housing to bias said retaining piston away from said first longitudinal wall such that said return valve is closed, a flow control valve piston disposed in said internal bore, a face of said control valve piston and said second longitudinal wall of said housing defining an inlet chamber therebetween, said inlet chamber including said inlet port, an opposing face of said flow control valve piston and an opposing face of said retaining piston defining an intermediate chamber therebetween, said intermediate chamber including said first brake port, wherein said first brake port and said second brake port are directly interconnected by way of an unobstructed channel disposed between said housing and said wheel brake.

9. An anti-lock brake system as recited in claim 8, wherein a second spring is disposed in said intermediate chamber between said retaining piston and said flow control valve piston to bias said flow control valve piston away from said first brake port.

10. An anti-lock brake system as recited in claim 8, wherein said return valve comprises a channel within said retaining piston such that said return valve opens when said channel is aligned with said second brake port.

11. An anti-lock brake system, comprising:
    a master cylinder;
    a wheel brake;
    a brake line connecting said master cylinder to said wheel brake;
    a flow control valve placed in said brake line between said master cylinder and said wheel brake, said control valve including a housing, said housing having an internal bore with a first longitudinal wall and a second longitudinal wall, wherein an inlet port, a first brake port, a second brake port, and an outlet port extend from an outer surface of said housing to said internal bore, a retaining piston disposed in said internal bore, an outlet chamber defined between a face of said retaining piston and said housing, said outlet chamber including said second brake port and said outlet port, a return valve selectively connecting said second brake port with said outlet port, a first spring disposed between said face of said retaining piston and said first longitudinal wall of said housing to bias said retaining piston away from said first longitudinal wall such that said return valve is closed, a flow control valve piston disposed in said bore, a face of said control valve piston and said retaining piston defining an inlet chamber therebetween, said inlet chamber including said inlet port, an opposing face of said flow control valve piston and said second longitudinal wall of said housing defining an intermediate chamber therebetween, said intermediate chamber including said first brake port, wherein said first brake port and said second brake port are directly interconnected by way of an unobstructed channel disposed between said housing and said wheel brake.

12. An anti-lock brake system as recited in claim 11, wherein a second spring is disposed in said intermediate chamber between said flow control valve piston and said second longitudinal wall of said housing to bias said flow control valve piston away from said first brake port.

13. An anti-lock brake system as recited in claim 1, wherein said return valve comprises a seat valve, a first ball selectively engaging a sealing seat in said outlet chamber, a first tappet extending away from said face of said retaining piston to selectively disengage said first ball said sealing seat.

14. An anti-lock brake system as recited in claim 13, wherein said flow control valve piston comprises a central bore and a sealing seat which selectively seats a second ball, a second tappet extending away from an opposing face of said retaining piston to selectively pass through said central bore to unseat said second ball from said sealing seat of said control valve piston.

15. An anti-lock brake system as recited in claim 14, wherein said sealing seat includes a recess to permit throttled flow between said inlet chamber and said intermediate chamber when said second ball is seated on said sealing seat of said control valve piston.

* * * * *

UNITED STATES PATENT AND TRADEMARK OFFICE
CERTIFICATE OF CORRECTION

PATENT NO. : 5,472,266
DATED : 12/5/95
INVENTOR(S) : P. Volz; D. Zaviska

It is certified that error appears in the above-indentified patent and that said Letters Patent is hereby corrected as shown below:

In column 14, line 2, "1" should be changed to --11--;
in line 6, after "ball" please insert --from--.

Signed and Sealed this

Twenty-seventh Day of August, 1996

Attest:

BRUCE LEHMAN

Attesting Officer    Commissioner of Patents and Trademarks